United States Patent
Yao et al.

(10) Patent No.: US 11,614,128 B2
(45) Date of Patent: Mar. 28, 2023

(54) CLUTCH STRUCTURE

(71) Applicant: Li-Ho Yao, Taipei (TW)

(72) Inventors: Li-Ho Yao, Taipei (TW); Norman Lien, Taipei (TW); Pei-Sheng Hsieh, Taipei (TW); Chi-Chen Tien, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/585,488

(22) Filed: Jan. 26, 2022

(65) Prior Publication Data
US 2022/0268322 A1    Aug. 25, 2022

(30) Foreign Application Priority Data

Feb. 22, 2021   (TW) .................................. 110106140

(51) Int. Cl.
| | |
|---|---|
| *F16D 13/52* | (2006.01) |
| *F16D 13/58* | (2006.01) |
| *F16D 23/12* | (2006.01) |
| *F16D 28/00* | (2006.01) |
| *F16D 125/36* | (2012.01) |
| *F16D 125/52* | (2012.01) |

(52) U.S. Cl.
CPC ............. *F16D 13/52* (2013.01); *F16D 13/58* (2013.01); *F16D 23/12* (2013.01); *F16D 28/00* (2013.01); *F16D 2023/123* (2013.01); *F16D 2125/36* (2013.01); *F16D 2125/52* (2013.01)

(58) Field of Classification Search
CPC ........................... F16D 13/52; F16D 2023/123
See application file for complete search history.

(56) References Cited

U.S. PATENT DOCUMENTS

| | | | | |
|---|---|---|---|---|
| 2004/0099071 | A1* | 5/2004 | Bai ......................... | F16D 13/04 74/56 |
| 2014/0116180 | A1* | 5/2014 | Keller ..................... | F16H 61/68 74/473.36 |
| 2018/0087640 | A1* | 3/2018 | Numabe ............... | B60K 17/165 |
| 2018/0201128 | A1* | 7/2018 | Niimura ................ | F16D 11/14 |

FOREIGN PATENT DOCUMENTS

KR        20140147439 A  * 12/2014  ............. F16D 13/52

* cited by examiner

*Primary Examiner* — Stacey A Fluhart
(74) *Attorney, Agent, or Firm* — Leong C. Lei

(57) ABSTRACT

A clutch structure that includes a motor to directly drive a rotary disc of an actuation unit, and the actuation unit further directly act on a push unit, so as to achieve reduction of size. Further, the push unit has a spring holder that drives a push bracket to press against a clutching unit, and the push bracket and the clutching unit are rotatably in synchronization with each other and a group of balls is arranged between the push bracket and the spring holder, such that smooth rotation can be maintained even during the process of pressing to thereby effectively reduce pause and setback incurring in coupling and connection and also to efficiently establish a transmission clutching force to have the operability not affected by the delay.

15 Claims, 5 Drawing Sheets

US 11,614,128 B2

CLUTCH STRUCTURE

TECHNICAL FIELD OF THE INVENTION

The present invention relates generally to a clutch, and more particularly to a clutch that has a simplified structure and thus a reduced size for easy installation in a narrow space.

DESCRIPTION OF THE PRIOR ART

Existing frictional clutches involve various different designs of actuation members, among which the most commonly seen are electromagnetic type and hydraulic type. The electromagnetic type needs to arrange an electromagnetic valve, electrical components, and electrical wires inside the clutch, such that the structure is complicated and the widthwise dimension is large. In addition, the clutching power is essentially induced by an electromagnetic force, so that the force acting on clutch plates is limited and thus the clutching power of the clutch plates is relatively weak. As to the hydraulic type, it needs to arrange hydraulic fluid channels in the clutch, such as hydraulic fluid passages formed in a rotary shaft. This not only makes the structure extremely sophisticated but also suffers hydraulic fluid related deficiencies in relation to compression ratio and quality deterioration, and would result in issues of instability of pressing force. Further, in consideration of leaking prevention, high pressure is commonly not involved, so that the clutching power of the clutch is generally unsatisfactory. Further, the prior art devices, for both the electromagnetic type and the hydraulic type, suffers fundamental issues of high difficulty in respect of fabrication and assembly and also high risk of easy failure, and thus, there exists a drawback of high cost.

To resolve the previously discussed issues, manufacturers have proposed certain clutch structures, such as Taiwan Patent Application No. 105129499, which includes an external drive assembly that drives a driving disc and a driven disc to move, in a radial direction, a pushing member, so that the pushing member causes lining plates to combine together for moving a driven member on a driven side. However, the size is affected by the external drive assembly to have an enlarged overall width, and this is disadvantageous for installation and application in a narrow space. Further, in a static condition, contact engagement induced between the pushing member and the lining plates that are rotated in unison with a transmission shaft may easily experience pause and setback, leading to a delay of transmission and thus affecting operability and reliability thereof.

SUMMARY OF THE INVENTION

The primary objective of the present invention is to realize structure simplification and effective reduction of size so as to be easily installed and applied in a narrow space.

Further, a second objective of the present invention is to effectively reduce pause and setback in coupling and connection and also to efficiently establish a transmission clutching force so as not have the operability affected by pause and setback.

Further, an additional objective of the present invention is to provide an acting force for pushing that is realized through mechanical direct pushing, so that the torque is made large and positive drivability and reliability are enhanced.

DETAILED DESCRIPTION OF THE PREFERRED EMBODIMENT

Figure 1:
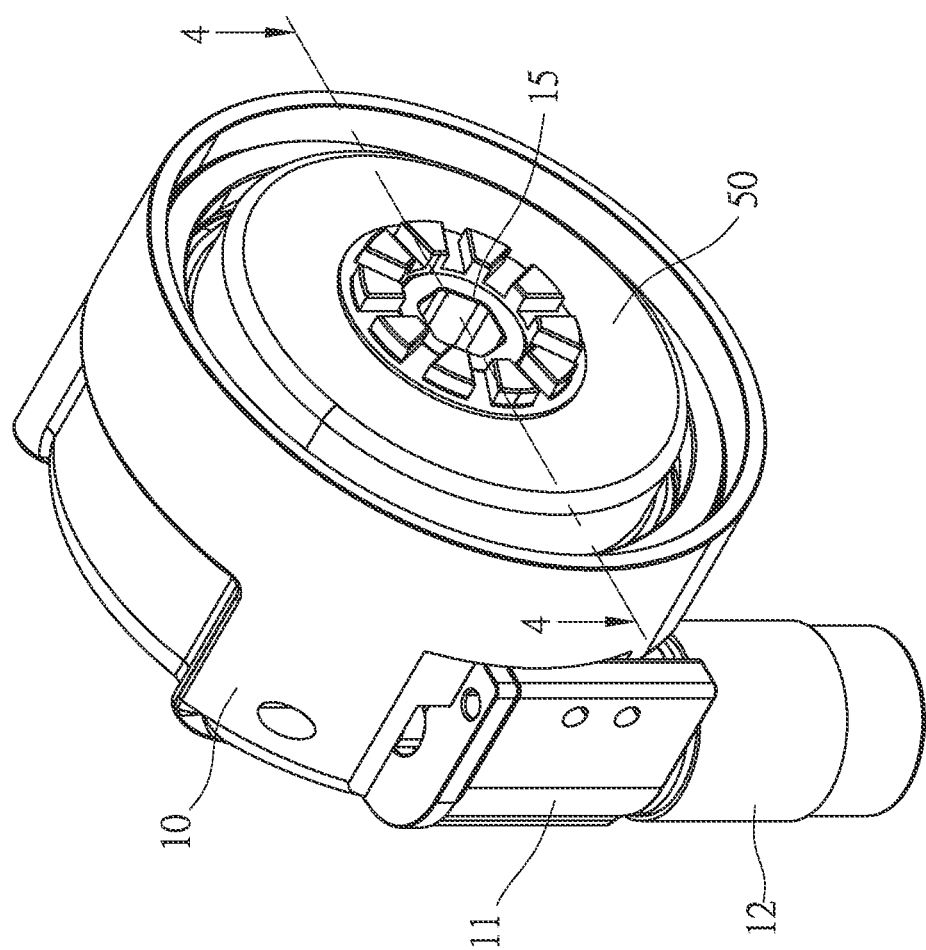
FIG. 1 is a perspective view of the present invention.
Figure 2:
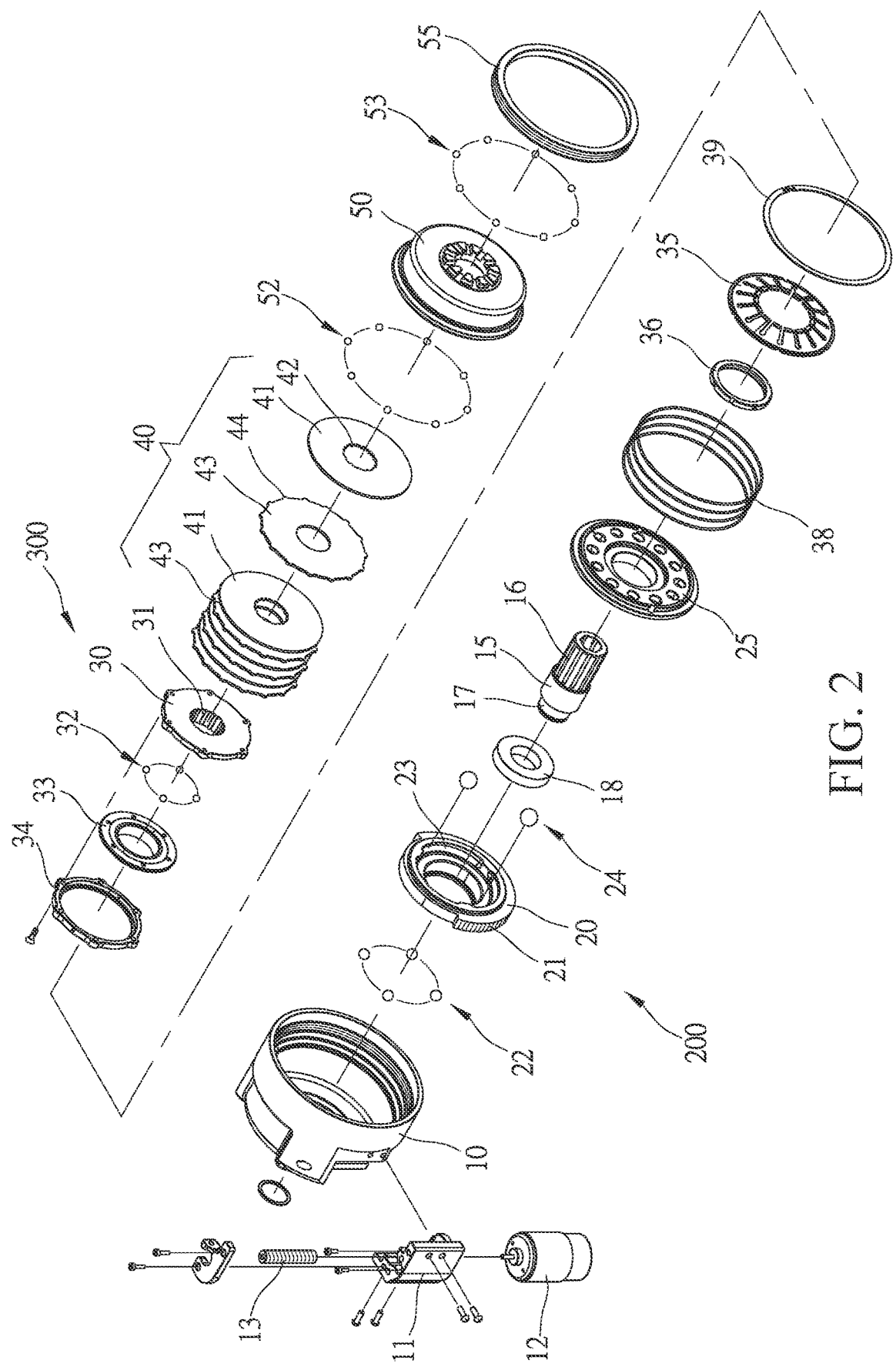
FIG. 2 is an exploded view of the present invention.

The present invention relates to a clutch structure that functions to transmit a rotation driving power to a driven side. As shown in FIGS. 1 and 2, the clutch structure comprises a stationary casing 10, an input shaft 15, an actuation unit 200, a push unit 300, a clutching unit 40, and an output casing 50 that serves as the driven side. The input shaft 15 is driven by the rotation driving power and is rotatably mounted inside the stationary casing 10 by means of the actuation unit 200. The push unit 300, the clutching unit 40, and the output casing 50 are arranged, in sequence, on the input shaft 15 so that the push unit 300 that is mounted on the input shaft 15 is operable to selectively drive the clutching unit 40 to realize a clutching operation thereby allowing the input shaft 15 to selectively transmit the rotation driving power to the output casing 50.

Figure 3:
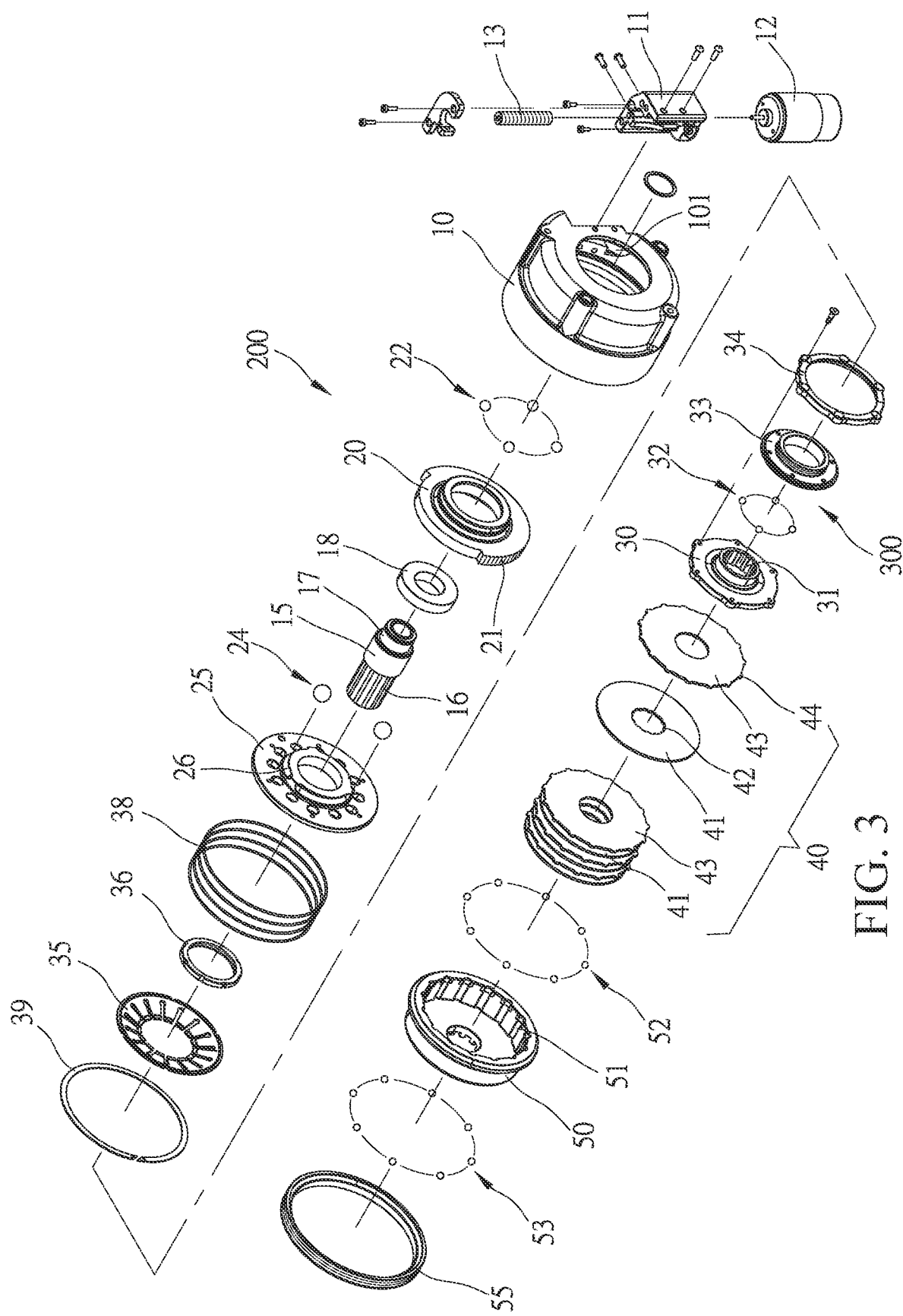
FIG. 3 is an exploded view of the present invention taken from a different perspective.
Figure 4:
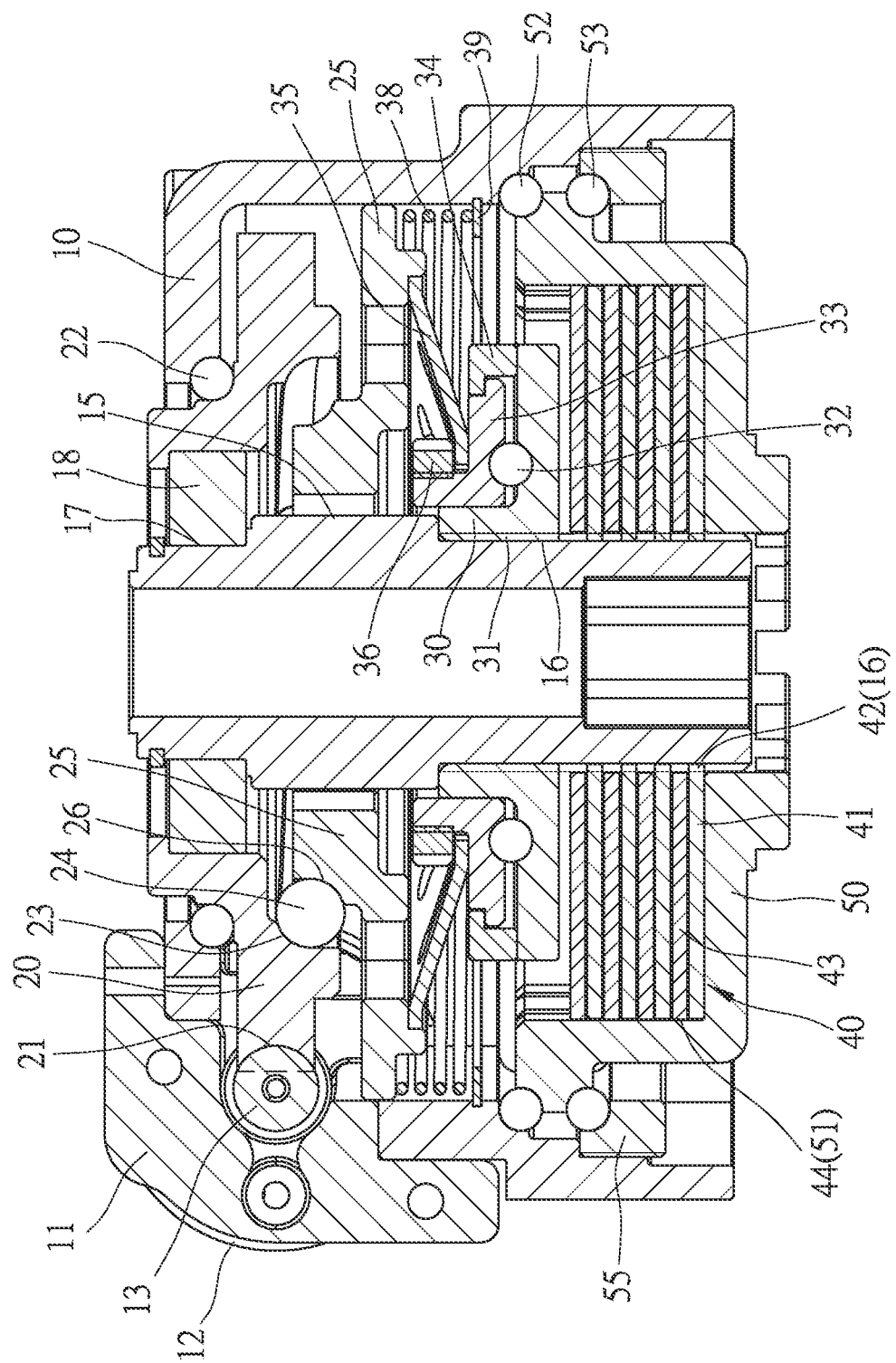
FIG. 4 is a cross-sectional view of present invention, in an assembled condition.

Details of the clutch structure are shown in FIGS. 2, 3, and 4, wherein the stationary casing 10 is provided with a through opening 101 formed in an outer circumference thereof and communicating between inside and outside, for receiving a motor 12 of which an output shaft is connected to a worm 13 to mount thereto to have the worm 13 engage with the actuation unit 200 arranged in the interior of the casing. The stationary casing 10 is provided with a protection lid 11 mounted thereto at a location corresponding to the through opening 101. The input shaft 15 is formed, in an end thereof corresponding to an open end of the stationary casing 10, with a plurality of external spline teeth 16 that extend in an axial direction, and the input shaft 15 is provided, on an opposite end thereof, with a shaft coupling section 17, which is extended into and arranged, as being rotatably supported by a bearing 18, in a center of the actuation unit 200 inside the stationary casing 10.

The actuation unit 200 comprises a rotary disc 20 that is rotatably mounted on the bearing 18 of the input shaft 15 and a push disc 25. A group of balls 22 is interposed between the rotary disc 20 and the stationary casing 10, so that the rotary disc 20 is rotatable, in a stable and smooth manner, inside the stationary casing 10 and relative to the input shaft 15 and the stationary casing 10. The rotary disc 20 has a circumference that is formed with a worm gear 21 engageable with the worm 13 of the motor 12, so that the motor 12 is operable to selectively drive the rotary disc 20 to rotate clockwise or counterclockwise. The rotary disc 20 is formed, in a side surface thereof corresponding to the push disc 25, with at least two roller channels 23 that are equally spaced, and the push disc 25 is also formed, in a surface thereof, with at least two corresponding roller channels 26, wherein each pair of corresponding roller channels 23, 26 interpose a roller 24 therebetween so that the rotary disc 20, when set in rotation, may selectively cause the push disc 25 to move away or to retract backward.

Further, the push unit 300 is arranged on the input shaft 15, and the push unit 300 comprises a push bracket 30, a spring holder 33, and a bowl-shaped spring plate 35, wherein the push bracket 30 has a central inner circumference that is formed with a plurality of internal spline teeth 31 corresponding to the external spline teeth 16 of the input shaft 15, to allow the push bracket 30 to selectively contact and push against the clutching unit 40 and also to rotate in unison with the input shaft 15. The spring holder 33 is arranged on an axle part of the push bracket 30, and a group of balls 32 is interposed between the spring holder 33 and the push bracket 30 to keep smooth rotation of the push bracket 30. A constraint ring 34 that has an inside diameter smaller than an outside diameter of the spring holder 33 is fixed to the push bracket 30 to constrain the spring holder 33 on the push bracket 30 for not detaching therefrom. The bowl-shaped spring plate 35 is mounted by a nut 36 to have an inner circumference fixed to the spring holder 33, while an outer circumference of the bowl-shaped spring plate 35 is retained on the push disc 25 arranged on an opposite side, so that the bowl-shaped spring plate 35 may provide a restoration preloading force when the push unit 300 is subjected to pushing by the push disc 25 of the actuation unit 200. Further, the push unit 300 includes a compression spring 38 of which an end is supported on one side of the push disc 25 that corresponds to the bowl-shaped spring plate 35, and a stop ring 39 is arranged in the interior of the stationary casing 10 to support an opposite end of the compression spring 38 in order to generate, with respect to the push disc 25, a spare restoration preloading force and also to help overcome tolerance of assembly to make the movement or operation of the push disc 25 smoother.

The clutching unit 40 is formed a plurality of first lining plates 41 and a plurality of second lining plates 43 that are alternately arranged in a spaced manner, wherein the first lining plates 41 have a central inner circumference that is formed with internal spline teeth 42 corresponding to the external spline teeth 16 of the input shaft 15; the first lining plates 41 are set in free rotation relative to the output casing 50; central inner circumferences of the second lining plates 43 are set in free rotation relative to the input shaft 15; and outer circumferences of the second lining plates 43 are formed with a plurality of external spline teeth 44 in mating engagement with the output casing 50.

The output casing 50 is rotatably mounted to the stationary casing 10 by means of groups of balls 52, 53 respectively arranged on two sides thereof and is restrained on the stationary casing 10 by means of a lock ring cover 55. Further, the output casing 50 is formed, in an inner circumference thereof, with a plurality of internal spline teeth 51 corresponding to the external spline teeth 44 of the second lining plates 43, so that the output casing 50 is drivable by the second lining plates 43 of the clutching unit 40 to rotate relative to the stationary casing 10.

As such, a clutch structure that has a small size and helps reduce pause and setback is provided.

An actual application of the present invention is illustrated in FIG. 4. In a normal operation, the motor 12 drives, by means of the worm 13, the rotary disc 20 of the actuation unit 200 to an inactive position, where the rollers 24 are caused to deeply move into the interior of the roller channels 23, 26 between the rotary disc 20 and the push disc 25 to allow the push disc 25 to be forced backward simultaneously by the bowl-shaped spring plate 35 and the compression spring 38 of the push unit 300, so that the clutching unit 40 is not pushed by the push bracket 30 of the push unit 300, and consequently, adjacent ones of the first and second lining plates 41, 43 of the clutching unit 40 are not kept in frictional engagement with each other and the rotation driving power is not transmitted through the input shaft 15 and the clutching unit 40 to the output casing 50, and therefore, the output casing 50 remains fixed.

Figure 5:
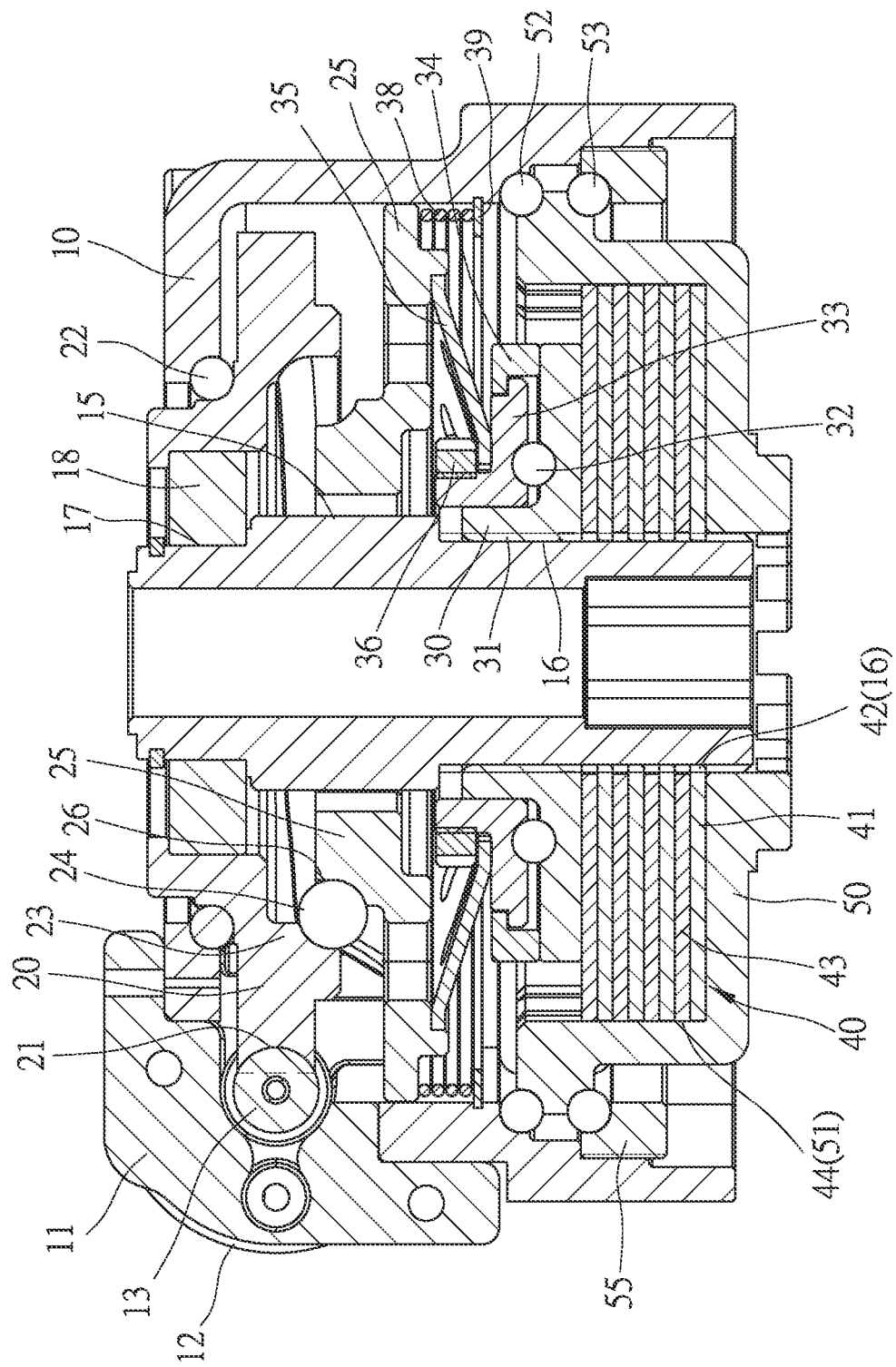
FIG. 5 is a schematic view illustrating an operation of the present invention in an actual application.

Oppositely, as shown in FIG. 5, when the motor 12 drives, by means of the worm 13, the rotary disc 20 of the actuation unit 200 to rotate to a transmitting and coupling position, the rotary disc 20 of the actuation unit 200 is caused to rotate relative to the push disc 25 and the rollers 24 are caused to force the push disc 25 to move in a direction toward the push unit 300 to thereby compress the bowl-shaped spring plate 35 and the compression spring 38 that, as undergoing deformation, result in pressing against the clutching unit 40 and generates restoration preloading force for use in a next cycle of operation. The clutching unit 40 is thus subjected to pressing by the spring holder 33 and the push bracket 30 of the push unit 300, and adjacent ones of the first and second lining plates 41, 43 of the clutching unit 40 are set in contact and engagement with each other so that a frictional force induced between the two achieves coupling therebetween to allow the rotation driving power to transmit through the input shaft 15 and the clutching unit 40 to the output casing 50, and consequently, the output casing 50 is thus driven.

Based on the description provided above in relation to the structure and operation, the present invention provides an arrangement in which the clutch structure directly drives, by means of the motor 12, the rotary disc of the actuation unit 200, and the actuation unit 200 is further allowed to directly drive or act on the push unit 300, so that the structure is effectively simplified and the size is reduced, allowing for easy installation and application in a narrow space. Further, when the spring holder 33 of the push unit 300 drives the push bracket 30 to press against the clutching unit 40, the push bracket 30 and the clutching unit 40 are set in synchronous rotation with respect to each other, and the push bracket 30 and the spring holder 33 are provided therebetween with the group of balls 32, so that the rotation can be kept smooth even during the process of pressing. This effectively reduce the occurrence of pause and setback at the coupling site and also helps to fast establish a transmission clutching force, so that the operability is not affected by such delays. Further, the clutch structure of the present invention uses a driving action force that is provided as mechanical direct pushing, so that the torque is made large and positive drivability and reliability are enhanced.

We claim:

1. A clutch structure, comprising:
   a stationary casing, which has an outer circumference to which a motor is mounted, the motor comprising a worm that extends into an interior of the stationary casing;
   an actuation unit, which is arranged in the interior of the stationary casing, the actuation unit comprising a rotary disc and a push disc, the rotary disc having a circumference that is formed with a worm gear in mating engagement with the worm, at least two rollers being arranged between the rotary disc and the push disc and equally spaced from each other;
   an input shaft, which is rotatably extended into a center of the rotary disc of the actuation unit;
   a push unit, which is mounted on the input shaft, the push unit comprising a push bracket, a spring holder, and a bowl-shaped spring plate, wherein the push bracket is coupled to the input shaft in a manner of being parallel slidable and synchronously rotatable with respect thereto, wherein the spring holder is rotatably arranged on the push bracket, and the bowl-shaped spring plate is deformably supported between the spring holder and the push disc, such that the bowl-shaped spring plate is deformable between the push disc and the push bracket to apply a spring force that is transmitted through the spring holder to act on the push bracket;

a clutching unit, which is arranged on the input shaft at one side thereof that is adjacent to the push unit, the clutching unit comprising a plurality of first lining plates and a plurality of second lining plates that are alternately arranged in a spaced manner, wherein the first lining plates are coupled to the input shaft in a manner of being parallel slidable and synchronously rotatable with respect thereto, and the second lining plates are arranged in a manner of being rotatable relative to the input shaft; and an output casing, which is rotatably mounted in the interior of the stationary casing at one side thereof that is adjacent to the clutching unit, the output casing being coupled to the second lining plates in a manner of being parallel slidable and synchronously rotatable with respect thereto.

2. The clutch structure according to claim 1, wherein the stationary casing has an outer circumference in which a through opening communicating with inside and outside is formed to receive the worm of the motor to extend therethrough, and the stationary casing is provided with a protection lid mounted thereto at a location corresponding to the through opening.

3. The clutch structure according to claim 1, wherein a group of balls is interposed between the rotary disc and the stationary casing of the actuation unit.

4. The clutch structure according to claim 1, wherein the rotary disc and the push disc of the actuation unit have surfaces that face each other and are formed with at least two roller channels that are equally spaced for respectively receiving the rollers to be interposed therebetween.

5. The clutch structure according to claim 1, wherein the input shaft has an end that corresponds to the rotary disc of the actuation unit and is formed with a shaft coupling section that is supported by a bearing to extend into a center of the rotary disc.

6. The clutch structure according to claim 5, wherein the input shaft has an outer circumference that is formed, in a portion corresponding to the push unit and the clutching unit, with a plurality of external spline teeth that extend in an axial direction, and a central inner circumference of the push bracket of the push unit is formed with a plurality of internal spline teeth corresponding thereto and a central inner circumference of the first lining plates of the clutching unit is also formed with a plurality of internal spline teeth corresponding thereto.

7. The clutch structure according to claim 6, wherein an outer circumference of the second lining plates of the clutching unit is formed with a plurality of external spline teeth, and an inner circumference of the output casing is formed with a plurality of internal spline teeth corresponding thereto.

8. The clutch structure according to claim 1, wherein the input shaft has an outer circumference that is formed, in a portion corresponding to the push unit and the clutching unit, with a plurality of external spline teeth that extend in an axial direction, and a central inner circumference of the push bracket of the push unit is formed with a plurality of internal spline teeth corresponding thereto and a central inner circumference of the first lining plates of the clutching unit is also formed with a plurality of internal spline teeth corresponding thereto.

9. The clutch structure according to claim 8, wherein an outer circumference of the second lining plates of the clutching unit is formed with a plurality of external spline teeth, and an inner circumference of the output casing is formed with a plurality of internal spline teeth corresponding thereto.

10. The clutch structure according to claim 1, wherein a group of balls is interposed between the spring holder and the push bracket.

11. The clutch structure according to claim 1, wherein a constraint ring of which an inside diameter is smaller than an outside diameter of the spring holder is fixed to the push bracket of the push unit.

12. The clutch structure according to claim 1, wherein the bowl-shaped spring plate of the push unit is mounted by a nut to have an inner circumference thereof fixed to the spring holder, and an outer circumference of the bowl-shaped spring plate is retained on the push disc at an opposite side.

13. The clutch structure according to claim 12, wherein the push unit comprises a compression spring of which an end is supported on one side of the push disc that corresponds to the bowl-shaped spring plate, and a stop ring is arranged in the interior of the stationary casing to support an opposite end of the compression spring.

14. The clutch structure according to claim 1, wherein the push unit comprises a compression spring of which an end is supported on one side of the push disc that corresponds to the bowl-shaped spring plate, and a stop ring is arranged in the interior of the stationary casing to support an opposite end of the compression spring.

15. The clutch structure according to claim 1, wherein the output casing is rotatably mounted to the stationary casing by means of groups of balls respectively arranged on two sides thereof and is restrained on the stationary casing by means of a lock ring cover.

* * * * *